US005352965A

United States Patent [19]

Kawabata

[11] Patent Number: 5,352,965

[45] Date of Patent: Oct. 4, 1994

[54] CONTAINER CRANE DRIVING CONTROL SYSTEM

[75] Inventor: Yoshihiko Kawabata, Ichikawa, Japan

[73] Assignee: Kabushiki Kaisha Toshiba, Kawasaki, Japan

[21] Appl. No.: 143,065

[22] Filed: Oct. 29, 1993

[30] Foreign Application Priority Data

Oct. 29, 1992 [JP] Japan .................................. 4-290609

[51] Int. Cl.[5] .......................... H02P 7/74; B66C 13/40

[52] U.S. Cl. ...................................... 318/807; 318/51; 212/160

[58] Field of Search ............... 318/766, 767, 798, 799, 318/800, 801, 806, 807, 808, 810, 812, 51, 53, 66, 67, 110; 212/159, 160; 74/847

[56] References Cited

U.S. PATENT DOCUMENTS 3,783,795 1/1974 Helmer .
4,838,438 6/1989 Ishige et al. .
4,890,047 12/1989 Maney .
4,965,847 10/1990 Jurkowski et al. .
5,133,465 7/1992 Kalan .

FOREIGN PATENT DOCUMENTS 0214300 3/1987 European Pat. Off. .
WO88/09584 12/1988 PCT Int'l Appl. .

OTHER PUBLICATIONS

IEEE Industry Applications Society Annual Meeting 1991, vol. 1, No. 91, pp. 347-353, May 29, 1991, F. Busschots, et al., "Application of Field Oriented Control in Crane Drives".

*Primary Examiner*—Bentsu Ro
*Attorney, Agent, or Firm*—Oblon, Spivak, McClelland, Maier & Neustadt

[57] ABSTRACT

A container crane driving control system having a main hoisting mode, a travel mode, a boom hoisting mode and a trolley mode comprises a first inverter main circuit unit, a first inverter control unit, a second inverter main circuit unit and a second inverter control unit. The first inverter main circuit unit is selectively controlled by a first V/F constant-control circuit or a first vector control circuit. As a result, a main hoisting squirrel-cage induction motor is vector-controlled and a plurality of traveling squirrel-cage induction motors are V/F constant-controlled. The second inverter main circuit unit is selectively controlled by a second V/F constant-control circuit or a second vector control circuit. As a result, a boom hoisting squirrel-cage induction motor is vector-controlled and at least one trolley squirrel-cage induction motor is V/F constant-controlled.

16 Claims, 7 Drawing Sheets

CONTAINER CRANE DRIVING CONTROL SYSTEM

BACKGROUND OF THE INVENTION

1. Field of the Invention

The present invention relates generally to a container crane driving control system, and more particularly, to a container crane driving control system using an AC motor system.

2. Description of the Related Art

A container crane loads or unloads containers into or from a container ship which is brought alongside a wharf.

Conventionally, an DC motor system is used to drive and control this type of container crane, since a great torque and accurate torque control are required to lift and lower a heavy container and to hoist a heavy boom.

Operation of this type of container crane has four modes: a main hoisting mode for lifting and lowering containers, a travel mode for causing a crane to travel, a boom hoisting mode for hoisting and lowering a boom and a trolley mode for causing a container to make a traverse motion.

The main hoisting mode and the travel mode cannot be performed simultaneously, and the boom hoisting mode and the trolley mode cannot be performed simultaneously. Hence, the container crane driving control system comprises a first driving control apparatus for controlling both the main hoisting mode and the travel mode and a second driving control apparatus for controlling both the boom hoisting mode and the trolley mode. In general, a leonard apparatus (thyristor leonard apparatus) is used as the main hoisting controller. The leonard apparatus controls an armature voltage of a DC motor, with a speed feedback, by means of a switching circuit using a switching element such as a thyristor, and controls a field current of the DC motor by means of another switching circuit. The others controller each are a voltage controller without a velocity feedback.

The aforementioned conventional container crane driving control system will be described with reference to FIG. 1.

An AC power source 10 is connected to a first driving control apparatus 20 and a second driving control apparatus 30.

The first driving control apparatus 20 comprises a main hoisting DC motor 21; eight traveling DC motors 22-1 to 22-8; an armature voltage thyristor circuit 23 for controlling both an armature voltage of the main hoisting DC motor 21 and armature voltages of the eight traveling DC motors 22-1 to 22-8; a field current thyristor circuit 24 for controlling the field current of the main hoisting DC motor 21; a field current thyristor circuit 25 for controlling the field currents of the traveling DC motors 22-1 to 22-8; a speed feedback circuit 26; five contactors 27-1 to 27-5 for individually connecting and disconnecting the main hoisting DC motor 21 and the traveling DC motors with the armature voltage thyristor circuit 23; four protecting circuits 28-1 to 28-4 for protecting the traveling DC motors 22-1 to 22-8; and four regulation resistor 29-1 to 29-4 connected to field circuits of the traveling DC motors 22-1 to 22-8.

An armature circuit of the main hoisting DC motor 21 is connected to the armature voltage thyristor circuit 23 and the contactor 27-1. A field circuit of the main hoisting DC motor 21 is connected to the field current thyristor circuit 24. The armature voltage thyristor circuit 23 A/D converts an output from the AC power source 10 and supplies a desired DC voltage to the armature circuit of the main hoisting DC motor 21. The field current thyristor circuit 25 A/D converts an output from the AC power source 10 and supplies a desired DC current to the field circuit of the main hoisting DC motor 21. The speed feedback circuit 26 is constituted by a tacho-generator (TG) 26B connected to the rotational shaft of the main hoisting DC motor 21 via a joint 26A. A speed signal, detected by the tacho-generator (TG) 26B, is supplied to the armature voltage thyristor circuit 23.

The armature circuits of the first and second traveling DC motors 22-1 and 22-2 are connected in series and the field circuits thereof are also connected in series. The armature circuits of the third and fourth traveling DC motors 22-3 and 22-4 are connected in series and the field circuits thereof are also connected in series. The armature circuits of the fifth and sixth traveling DC motors 22-5 and 22-6 are connected in series and the field circuits thereof are also connected in series. The armature circuits of the seventh and eighth traveling DC motors 22-7 and 22-8 are connected in series and the field circuits thereof are also connected in series. As a result, the eight traveling DC motors 22-1 to 22-8 are constructed as a four-series motor system. The four-pairs motor system performs a speed matching operation. The armature circuits of the series are connected to the armature voltage thyristor circuit 23 and are also connected to the contactors 27-2 to 27-5 and the protecting circuits 28-1 to 28-4, respectively. The field circuits of the series are connected to the field current thyristor circuit 25 and are also connected to the regulation resistor 29-1 to 29-4, respectively. The protecting circuits 28-1 to 28-4 respectively comprise current detectors 28A-1 to 28A-4, inserted in the armature circuits; and overload current relays 28B-1 to 28B-4. The armature voltage thyristor circuit 23 A/D converts an output from the AC power source 10 and supplies a desired DC voltage to the armature circuits of the traveling DC motors 22-1 to 22-8. The field current thyristor circuit 25 A/D converts an output from the AC power source 10 and supplies a desired DC current to the field circuits of the traveling DC motors 22-1 to 22-8.

The second driving control apparatus 30 is a leonard apparatus similar to the first driving control apparatus 20. However, the first driving control apparatus 20 has a circuit configuration for controlling one main hoisting apparatus and eight traveling DC motors, whereas the second driving control apparatus 30 has a circuit configuration for controlling one boom hoisting DC motor and one or two trolley DC motors.

In the conventional container crane driving control system as shown in FIG. 1, since the main hoisting mode and the travel mode cannot be performed simultaneously, the contactors 27-2 to 27-5 are open, when the contactor 27-1 is closed. In contrast, when the contactor 27-1 is open, the contactors 27-2 to 27-5 are closed. Thus, the armature circuit of the main hoisting DC motor 21 and the armature circuits of the traveling DC motors 22-1 to 22-8 can be selectively activated by the armature voltage thyristor circuit 23. As a result, the armature circuits of the main hoisting DC motor and the traveling DC motors 22-1 to 22-8 are simplified. In addition, the torque of the main hoisting DC motor can be large and can be can performed a speed matching operation with a high accuracy, thereby accurately lifting and lowering heavy containers. The same applies to the boom hoisting operation and trolley operation by the second driving control apparatus 30.

Since the above-described conventional container crane driving control system is a DC motor system, the a commutator of the DC motors must be maintained at intervals, and the brushes of the DC motor must be exchanged. Moreover, since the container crane is placed in a bay area such as a wharf, the DC motor system, which cannot easily be totally enclosed, has a structural drawback in that it is likely to suffer from salt damage.

SUMMARY OF THE INVENTION

It is accordingly an object of the present invention to provide a container crane driving control system in which an AC motor system having a simplified circuit configuration is used and which is capable of operating in a main hoisting mode, a boom hoisting mode, a travel mode and a trolley mode with characteristics required for a container crane.

The object can be achieved by a container crane driving control system comprising:

a main hoisting squirrel-cage induction motor for lifting and lowering a container;

a plurality of traveling squirrel-cage induction motors for causing the container to make a traversing motion;

a first inverter main circuit unit for supplying AC power to the main hoisting squirrel-cage induction motor and the plurality of traveling squirrel-cage induction motors;

a first connecting unit for selectively connecting the main hoisting squirrel-cage induction motor or the plurality of traveling squirrel-cage induction motors with the first inverter main circuit unit;

a first inverter control unit comprising:

a first V/F constant-control circuit for controlling the first inverter main circuit unit so that the ratio of the voltage to the frequency of the AC power supplied to the plurality of traveling squirrel-cage induction motors is maintained in a preset range;

a first vector control circuit for vector-controlling the first inverter main circuit unit so that a torque generated by the main hoisting squirrel-cage induction motor is equal to a preset value; and a first selection circuit for selectively supplying an output from the first V/F constant-control circuit or an output from the first vector control circuit to the first inverter main circuit unit;

a boom hoisting squirrel-cage induction motor for hoisting and lowering the boom;

at least one trolley squirrel-cage induction motor for causing the container to make a traversing motion;

a second inverter main circuit unit for supplying AC power to the boom hoisting squirrel-cage induction motor and the at least one trolley squirrel-cage induction motor;

a second connecting unit for selectively connecting the boom hoisting squirrel-cage induction motor or the at least one trolley squirrel-cage induction motor with the second inverter main circuit unit; and a second inverter control unit comprising:

a second V/F constant-control circuit for controlling the second inverter main circuit unit so that the ratio of the voltage to the frequency of the AC power supplied to the at least one trolley squirrel-cage induction motor is maintained in a preset range;

a second vector control circuit for vector-controlling the second inverter main circuit unit so that a torque generated by the boom hoisting squirrel-cage induction motor is equal to a preset value; and a second selection circuit for selectively supplying an output from the second V/F constant-control circuit or an output from the second vector control circuit to the second inverter main circuit unit.

The object can also be achieved by a container crane driving control system comprising:

a main hoisting squirrel-cage induction motor for lifting and lowering a container;

a plurality of traveling squirrel-cage induction motors for causing the container to make a traversing motion;

a first inverter main circuit unit for supplying AC power to the main hoisting squirrel-cage induction motor and the plurality of traveling squirrel-cage induction motors;

a first connecting unit for selectively connecting the main hoisting squirrel-cage induction motor or the plurality of traveling squirrel-cage induction motors with the first inverter main circuit unit;

a first inverter control unit comprising:

a first data storage circuit which prestores, in predetermined addresses, first V/F constant-control data for controlling the first inverter main circuit unit so that the ratio of the voltage to the frequency of the AC power supplied to the plurality of traveling squirrel-cage induction motors is maintained in a preset range and first vector control data for vector-controlling the first inverter main circuit unit so that a torque generated by the main hoisting squirrel-cage induction motor is equal to a preset value;

a first address generating circuit for generating an address for reading one of the first V/F constant-control data and the first vector control data from the first data storage circuit, when one of a drive command for the plurality of traveling squirrel-cage induction motors and a drive command for the main hoisting squirrel-cage induction motor is supplied thereto; and a first output circuit for supplying, to the first inverter main circuit unit, one of the first V/F constant-control data and the first vector control data read from the first data storage circuit in accordance with the address generated from the first address generating circuit;

a boom hoisting squirrel-cage induction motor for hoisting and lowering the boom;

at least one trolley squirrel-cage induction motor for causing the container to make a traverse motion;

a second inverter main circuit unit for supplying AC power to the boom hoisting squirrel-cage induction motor and the at least one trolley squirrel-cage induction motor;

a second connecting unit for selectively connecting the boom hoisting squirrel-cage induction motor or the at least one trolley squirrel-cage induction motor with the second inverter main circuit unit; and a second inverter control unit comprising:

a second data storage circuit which prestores, in predetermined addresses, second V/F constant-control data for controlling the second inverter main circuit unit so that the ratio of the voltage to the frequency of the AC power supplied to the at least one trolley squirrel-cage induction motor is maintained in a preset range and second vector control data for vector-controlling the second inverter main circuit unit so that a torque generated by the boom hoisting squirrel-cage induction motor is equal to a preset value;

a second address generating circuit for generating an address for reading one of the second V/F constant-control data and the second vector control data from the second data storage circuit, when one of a drive command for the at least one trolley squirrel-cage induction motor and a drive command for the boom hoisting squirrel-cage induction motor is supplied thereto; and a second output circuit for supplying, to the second inverter main circuit unit, one of the second V/F constant-control data and the second vector control data read from the first data storage circuit in accordance with the address generated from the second address generating circuit.

As described above, the present invention is directed to a container crane driving control system operated in a main hoisting mode, a travel mode, a boom hoisting mode and a trolley mode, comprising a first inverter main circuit unit, a first inverter control unit, a second inverter main circuit unit and a second inverter control unit. The first inverter main circuit unit is selectively subjected to a first F/V constant control or a first vector control. As a result, the main hoisting squirrel-cage induction motor is vector-controlled and the traveling squirrel-cage induction motor is V/F constant-controlled. The second inverter main circuit unit is selectively subjected to a second V/F constant control or a second vector control. As a result, the boom hoisting squirrel-cage induction motor is vector controlled and the at least one trolley squirrel-cage induction motor is V/F constant controlled.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
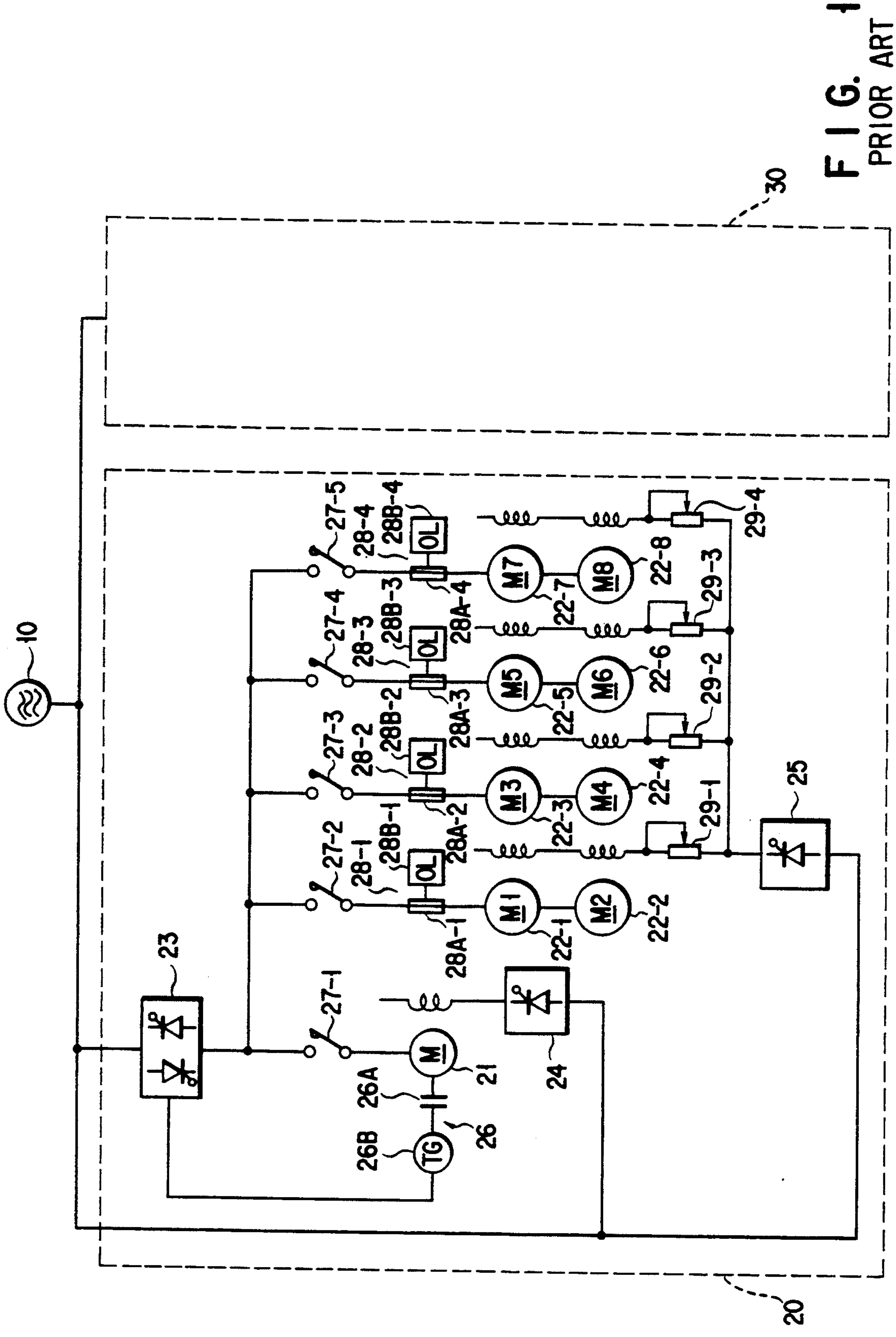
FIG. 1 PRIOR ART
FIG. 1 is a circuit diagram showing a conventional container crane driving control system.
Figure 2:
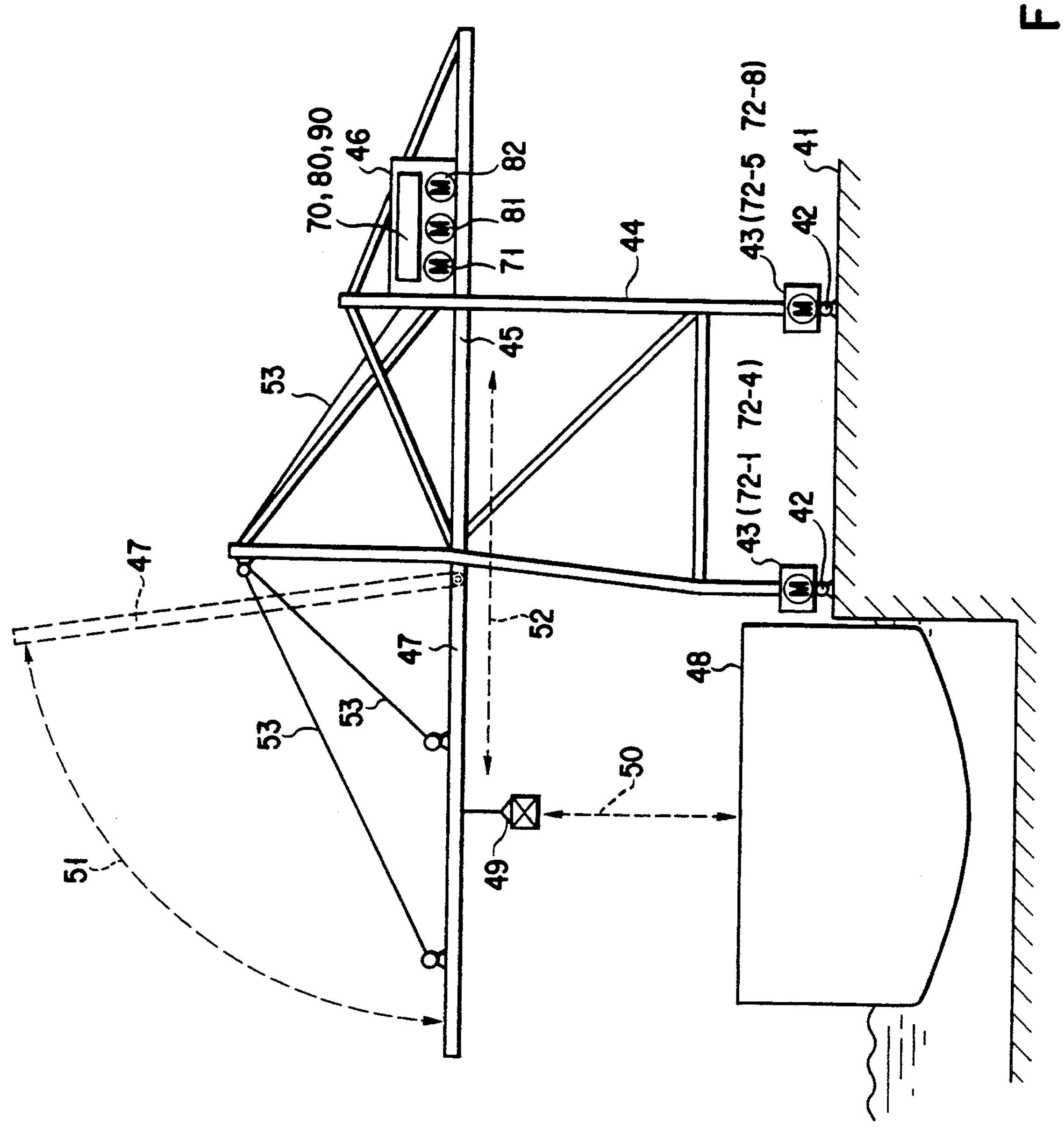
FIG. 2 is a diagram showing a container crane.

Prior to description of the preferred embodiments, a container crane to which the present invention is applied will be described with reference to FIG. 2. As shown in FIG. 2, a pair of traveling rails 42 are provided on a wharf 41. Four crane legs 44, each having a traveling unit 43 in the lowermost portion, are arranged on the traveling rails 42. A girder 45 is mounted on the four crane legs 44. An electricity and machinery room 46 is located on an end portion of the girder 45 and a boom 47 is connected to the other end portion thereof so that it can be bent. A container ship 48 is brought alongside the wharf 41. The electricity and machinery room 46 includes a main hoisting squirrel-cage induction motor 71, a boom hoisting squirrel-cage induction motor 81, a trolley squirrel-cage induction motor 82, a first driving control apparatus 70, a second driving control apparatus 80 and a primary controller 90.

Each traveling unit 43 incorporates two traveling squirrel-cage induction motors 72-1 and 72-2 (72-3 and 72-4, 72-5 and 72-6, or 72-7 and 72-8). In other words, the four traveling units 43 have eight traveling squirrel-cage induction motors 72-1, 72-2, 72-3, 72-4, 72-5, 72-6, 72-7 and 72-8. The main hoisting mode, the travel mode, the boom hoisting mode and the trolley mode can be set by the primary controller 90. When the main hoisting mode is set, a spreader 49 can be moved up and down as indicated by a broken line 50. When the travel mode is set, the traveling units 43 of the four crane legs 44 can be moved in a direction perpendicular to the plane of the drawing. When the boom hoisting mode is set, the boom 47 can be bent as indicated by a broken line 51 so as to prevent interference with a bridge of the container ship 48. When the trolley mode is set, the spreader 49 can be moved in a horizontal direction along the girder 45 and the boom 47, as indicated by a broken line 52.

The operations in the main hoisting mode, the boom hoisting mode and the trolley mode are performed by hoisting and lowering a wire 53 by means of the main hoisting squirrel-cage induction motor 71, the boom hoisting squirrel-cage induction motor 81 and the trolley squirrel-cage induction motor 82. In FIG. 2, only part of the wire 53 is shown.

AS described before, the main hoisting mode and the travel mode cannot be performed simultaneously, and the boom hoisting mode and the trolley mode cannot be performed simultaneously. Therefore, the container crane driving control system can be constituted by the first driving control apparatus 70 for controlling operations in both the main hoisting mode and the travel mode, the second driving control apparatus 80 for controlling operations in both the boom hoisting mode and the trolley mode, and the primary controller 90.

Figure 3:
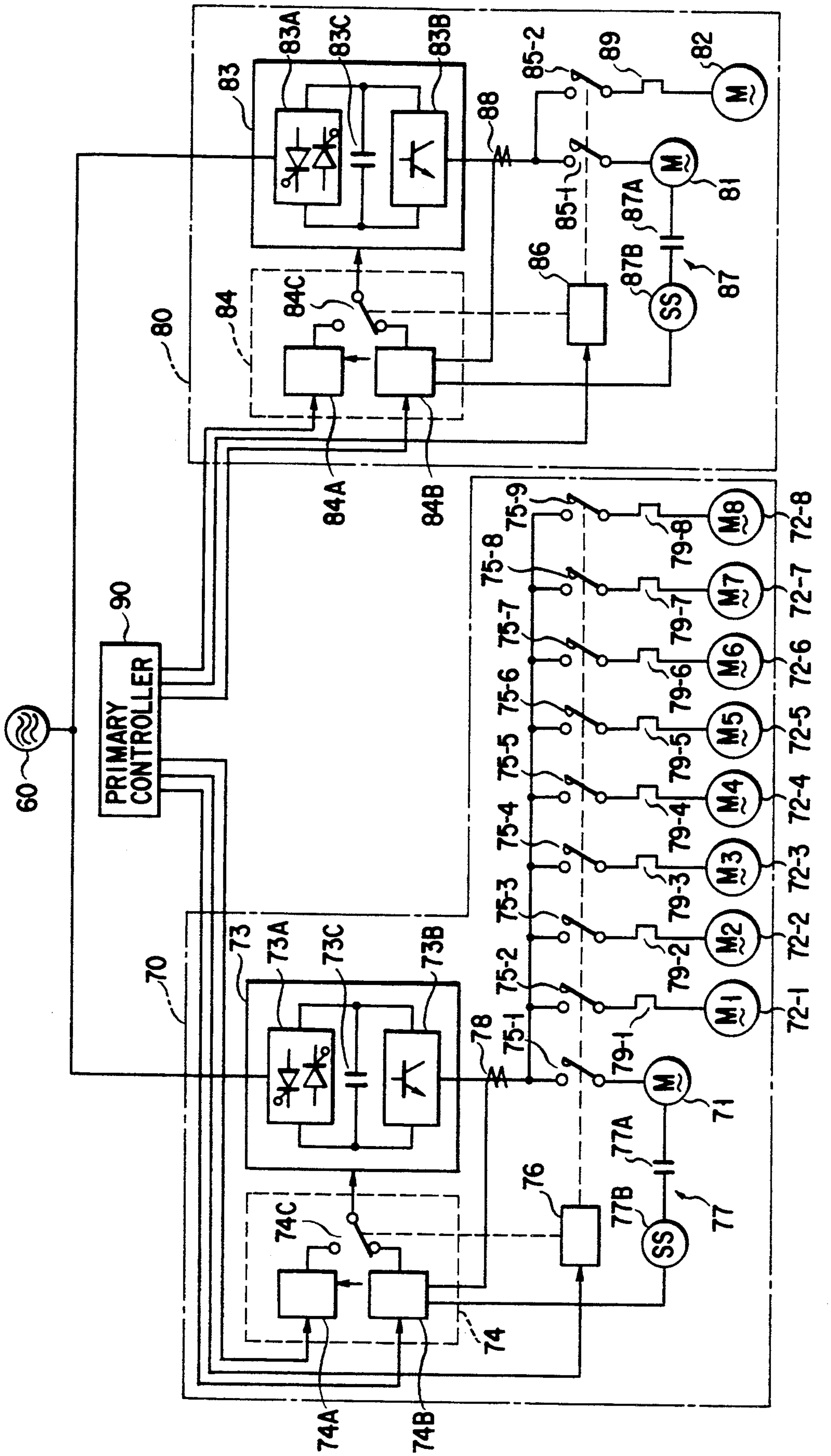
FIG. 3 is a circuit diagram showing a container crane driving control system according to a first embodiment of the present invention.

The container crane driving control system according to a first embodiment of the present invention will now be described with reference to FIG. 3. As described above, the container crane driving control system comprises the first driving control apparatus 70 for controlling operations in both the main hoisting mode and the travel mode, the second driving control apparatus 80 for controlling operations in both the boom hoisting mode and the trolley mode, and the primary controller 90. AC power is supplied to the first and second driving control apparatuses 70 and 80 from an AC power source 60.

The first driving control apparatus 70 for controlling operations in the main hoisting mode and the travel mode comprises the main hoisting squirrel-cage induction motor 71, the eight traveling squirrel-cage induction motors 72-1 to 72-8, a first inverter main circuit unit 73, a first inverter control unit 74, nine (or five) contactors 75-1 to 75-9, an interlock circuit 76, a speed feedback circuit 77, a current detector 78 and eight thermal relays 79-1 to 79-8.

The first inverter main circuit unit 73 supplies AC power selectively to the main hoisting squirrel-cage induction motor 71 or the eight traveling squirrel-cage induction motors 72-1 to 72-8. The electrical parameters (e.g., voltage, current, frequency) of the first inverter main circuit unit 73 have been adjusted in advance. The first inverter main circuit unit 73 comprises an AC/DC converter circuit 73A having a switching element such as a thyristor, a smoothing circuit 73B having a smoothing element such as a capacitor, and an inverter circuit 73C having a switching element such as a power transistor. The first inverter main circuit unit 73 is V/F constant-controlled or vector-controlled by the first inverter control unit 74. As a result, the main hoisting squirrel-cage induction motor 71 is vector-controlled and the eight traveling squirrel-cage induction motors 72-1 to 72-8 are speed matching-controlled at a constant ratio of V/F.

The first inverter control unit 74 comprises a first V/F constant-control circuit 74A, a first vector control circuit 74B and a first selection circuit 74C. The first V/F constant-control circuit 74A controls the first inverter main circuit unit 73, based on a command from the primary controller 90 to set the travel mode, so that the ratio of the voltage to the frequency of the AC power supplied to the traveling squirrel-cage induction motors 72-1 to 72-8 is maintained in a preset range. The first vector control circuit 74B vector-controls the first inverter main circuit unit 73, based on a command from the primary controller 90 to set the main hoisting mode, so that a torque generated by the main hoisting squirrel-cage induction motor is equal to a preset value. The first selection circuit 74C selectively supplies an output from the first V/F constant-control circuit 74A or an output from the first vector control circuit 74B to the first inverter main circuit unit 73, based on a command from the interlock circuit 76.

A typical example of the first V/F constant-control circuit 74A will be described with reference to FIG. 4. The first V/F constant-control circuit 74A comprises an oscillator 74A1, a frequency control unit 74A2, an F/V conversion unit 74A3 and a voltage control unit 74A4.

The oscillator 74A1 generates a pulse corresponding to an instruction value (a speed value) in the travel mode sent from the primary controller 90. The frequency control unit 74A2 frequency-controls the inverter circuit 73C of the first inverter main circuit unit 73 in accordance with the pulse output from the oscillator 74A1. The F/V conversion unit 73A3 converts the pulse output (frequency) from the oscillator 74A1 to a voltage signal. The voltage control unit 74A4 voltage-controls the AC/DC converter circuit 73A of the first inverter main circuit unit 73 based on outputs of the F/V converter unit 74A3 and the voltage detector 78. The V/F constant-control method executed by the first V/F constant-control circuit 74A is an open loop speed control system, unlike the vector control method executed by the first vector control circuit 74B which has a speed feedback circuit.

A typical example of the first vector control circuit 74B will be described with reference to FIG. 5. Vector control of an induction motor is to divide a primary current of the induction motor to an excitation current component for forming a secondary flux and a torque current component which crosses the excitation current component at right angles and to individually control these components, thereby controlling the speed and the torque at a high speed and a high accuracy so as to be suitable for a DC motor. The first vector control circuit 74B shown in FIG. 5 comprises a speed control unit 74B1, a vector control unit 74B2 and a PWM (pulse width modulation) control unit 74B3.

The speed control unit 74B1 supplies, to the vector control unit 74B2, a secondary current instruction value which makes an instruction value (speed torque value) of the main hoisting mode, output from the primary controller 90, equal to a speed detected value output from the speed feedback circuit 77. The vector control unit 74B2 supplies a primary current instruction value and the frequency and phase thereof to the PWM control unit 74B3 based on the secondary current instruction value output from the speed control unit 74B1, the speed detected value output from the speed feedback circuit 77 and a magnetization current instruction value (not shown). The PWM control unit 74B3 PWM-controls the first inverter main circuit unit 73 so that a main circuit current is supplied from the first inverter main circuit in accordance with the primary current instruction value output from the vector control unit 74B2 and the frequency and phase thereof so as to generate a predetermined torque. The first vector control circuit 74B is a vector control system with a speed sensor, for controlling a slip frequency by using a PWM inverter. However, a vector control circuit of another system can be employed.

A contactor 75-1 is inserted between the first inverter main circuit unit 73 and the main hoisting squirrel-cage induction motor 71. Contactors 75-2 to 75-9 are inserted between the first inverter main circuit unit 73 and the eight traveling squirrel-cage induction motors 72-1 to 72-8, respectively. The contactors 75-1 and 75-2 to 75-9 are opened and closed by the interlock circuit 76. More specifically, the contactor 75-1 and the contactors 75-2 to 75-9 are interlocked with each other by the interlock circuit 76 so that, when the main hoisting squirrel-cage induction motor 71 is connected to the first inverter main circuit unit 73, the traveling squirrel-cage induction motors 72-1 to 72-8 are not connected to the first inverter main circuit unit 73, and when the traveling squirrel-cage induction motors 72-1 to 72-8 are connected to the first inverter main circuit unit 73, the main hoisting squirrel-cage induction motor 71 is not connected to the first inverter main circuit unit 73. A electronic thermal rely which exists in the first inverter main circuit 71 prevents the main hoisting squirrel-cage induction motor 71 from overloading.

The speed feedback circuit 77 comprises a brushless resolver 77B connected to the rotational shaft of the main hoisting squirrel-cage induction motor 71 via a joint 77A. An output (speed detected value) of the brushless resolver 77B is supplied to the first vector control circuit 74B. Thermal relays 79-1 to 79-8 are respectively provided in the traveling squirrel-cage induction motors 72-1 to 72-8 to prevent the motors 72-1 to 72-8 from overloading.

The capacitance of the main hoisting squirrel-cage motor 71 is about 400 kW. The capacitance of each of the traveling squirrel-cage induction motors 72-1 to 72-8 is about 20 kW, and the total capacitance of the traveling squirrel-cage induction motors 72-1 to 72-8 is about 160 kW. Needless to say, the capacitance of the first inverter main circuit unit 73 is 400 kW or greater.

The second driving control apparatus 80 for controlling operations of hoisting and lowering the container boom comprises boom hoisting squirrel-cage induction motor 81, a trolley squirrel-cage induction motor 82, a second inverter main circuit unit 83, a second inverter control unit 84, two contactors 85-1 and 85-2, an interlock circuit 86, a speed feedback circuit 87, a voltage detector 88 and a thermal relay 89.

The second inverter main circuit unit 83 supplies AC power selectively to the boom hoisting squirrel-cage induction motor 81 or the trolley squirrel-cage induction motor 82. The electrical parameters (e.g., voltage, current, frequency) of the second inverter main circuit unit 83 have been adjusted in advance. The second inverter main circuit unit 83 comprises an AC/DC converter circuit 83A having a switching element such as a thyristor, a smoothing circuit 83B having a smoothing element such as a capacitor, and an inverter circuit 83C having a switching element such as a power transistor. The second inverter main circuit unit 83 is V/F constant-controlled or vector-controlled by the second inverter control unit 84. As a result, the boom hoisting squirrel-cage induction motor 81 is vector-controlled and the trolley squirrel-cage induction motor 82 is speed matching-controlled at a constant rate of V/F.

The second inverter control unit 84 comprises a second V/F constant-control circuit 84A, a second vector control circuit 84B and a second selection circuit 84C. The second V/F constant-control circuit 84A controls the second inverter main circuit unit 83, based on a command from the primary controller 90 to set the trolley mode, so that the ratio of the voltage to the frequency of the AC power supplied to the trolley squirrel-cage induction motor 82 is maintained in a preset range. The second vector control circuit 84B vector-controls the second inverter main circuit unit 83, based on a command from the primary controller 90 to set the boom hoisting mode, so that a torque generated by the boom hoisting squirrel-cage induction motor 81 is equal to a preset value. The second selection circuit 84C selectively supplies an output from the second V/F constant-control circuit 84A or an output from the second vector control circuit 84B to the second inverter main circuit unit 83, based on a command from the interlock circuit 86.

Figure 4:
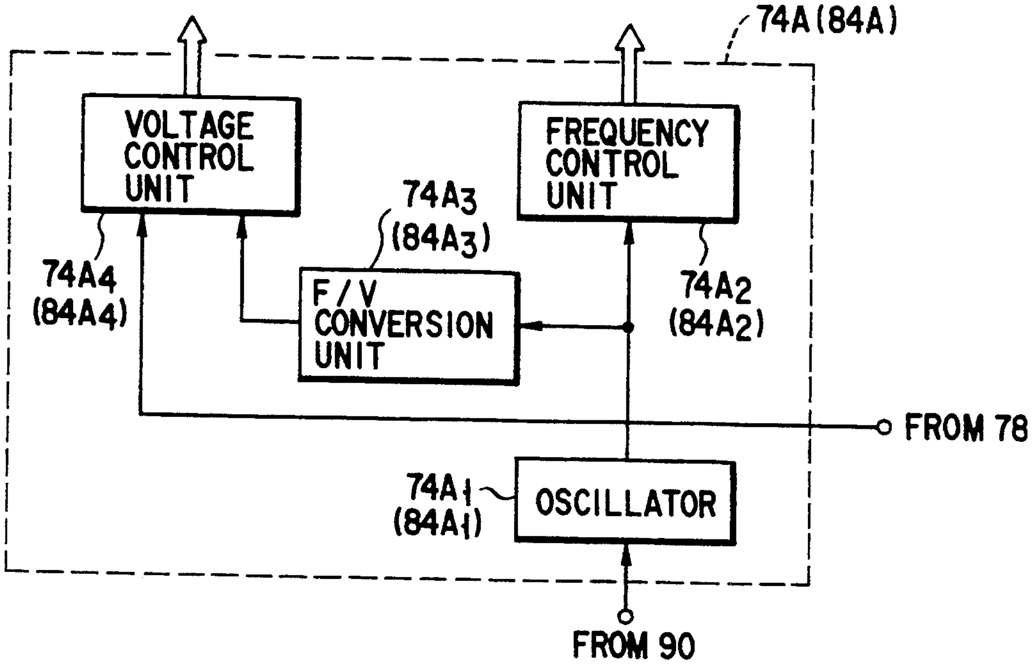
FIG. 4 is a block diagram showing a V/F constant-control circuit shown in FIG. 3.
Figure 5:
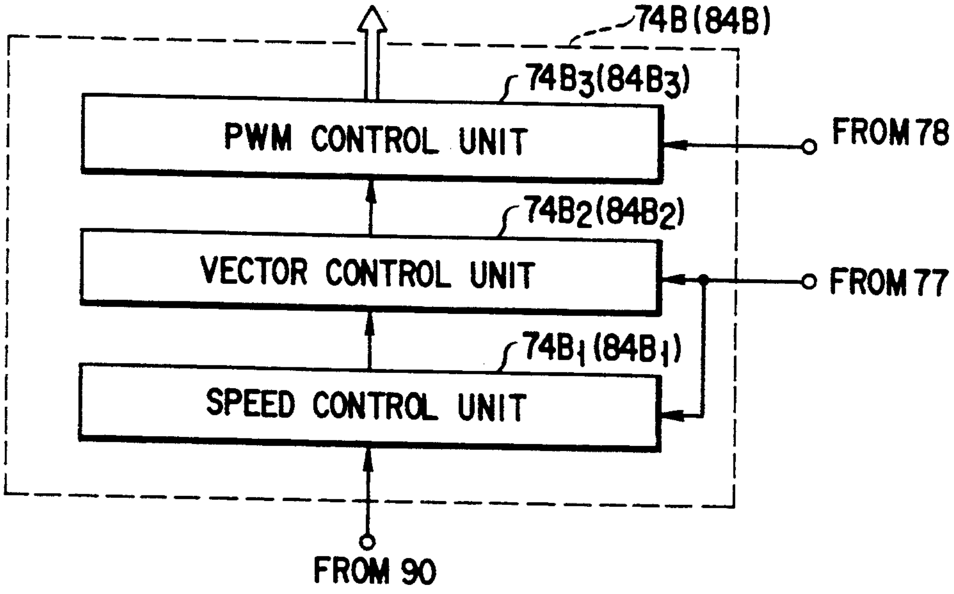
FIG. 5 is a block diagram showing a vector control circuit shown in FIG. 3.

The second V/F constant-control circuit 84A and the second vector control circuit 84B are basically the same as the first V/F constant-control circuit 74A and the first vector control circuit 74B as shown in FIGS. 4 and 5. Therefore, the description of the circuits 84A and 84B is omitted.

A contactor 85-1 is inserted between the second inverter main circuit unit 83 and the boom hoisting squirrel-cage induction motor 81. A contactor 85-2 is inserted between the second inverter main circuit unit 83 and the trolley squirrel-cage induction motor 82. The contactors 85-1 and 85-2 are opened and closed by the interlock circuit 86. More specifically, the contactors 85-1 and 85-2 are interlocked with each other by the interlock circuit 86 so that, when the boom hoisting squirrel-cage induction motor 81 is connected to the second inverter main circuit unit 83, the trolley squirrel-cage induction motor 82 is not connected to the second inverter main circuit unit 83, and when the trolley squirrel-cage induction motor 82 is connected to the second inverter main circuit unit 83, the boom hoisting squirrel-cage induction motor 81 is not connected to the second inverter main circuit unit 83.

The speed feedback circuit 87 comprises a brushless resolver 87B connected to the rotation shaft of the boom hoisting squirrel-cage induction motor 81 via a joint 87A. An output (speed detected value) of the brushless resolver 87B is supplied to the second vector control circuit 84B. The thermal relay 89 is provided in the trolley squirrel-cage induction motor 82 to prevent the motor 82 from overloading.

The capacitance of the boom hoisting squirrel-cage motor 81 is one hundred and several ten kw. The capacitance of the trolley squirrel-cage induction motor 82 is substantially the same as that of the boom hoisting squirrel-cage motor 81. Needless to say, the capacitance of the second inverter main circuit unit 83 is the same as or greater than the capacitance of the boom hoisting squirrel-cage motor 81 or the trolley squirrel-cage induction motor 82.

In the embodiment as described above, when the main hoisting mode is set by a command from the primary controller 90, the first selection circuit 74C is operated so that an output from the first vector control circuit 74B of the first inverter control unit 74 is supplied to the first inverter main circuit unit 73. As a result, the first inverter main control circuit unit 73 is subjected to vector control. Consequently, the main hoisting squirrel-cage induction motor 71 is vector-controlled by the command from the primary controller 90. On the other hand, when the travel mode is set by a command from the primary controller 90, the first selection circuit 74C is operated so that an output from the first V/F constant-control circuit 74A of the first inverter control unit 74 is supplied to the first inverter main circuit unit 73. As a result, the first inverter main control circuit unit 73 is subjected to V/F constant control. Consequently, the traveling squirrel-cage induction motors 72-1 to 72-8 are V/F constant-controlled.

When the boom hoisting mode is set by a command from the primary controller 90, the second selection circuit 84C is operated so that an output from the second vector control circuit 84B of the second inverter control unit 84 is supplied to the second inverter main circuit unit 83. As a result, the second inverter main control circuit unit 83 is subjected to vector control. Consequently, the boom hoisting squirrel-cage induction motor 81 is vector-controlled by the command from the primary controller 90. On the other hand, when the trolley mode is set by a command from the primary controller 90, the second selection circuit 84C is operated so that an output from the second V/F constant-control circuit 84A of the second inverter control unit 84 is supplied to the second inverter main circuit unit 83. As a result, the second inverter main control circuit unit 83 is subjected to V/F constant control. Consequently, the trolley squirrel-cage induction motor 82 is V/F constant-controlled.

According to the above embodiment, only the first inverter main circuit unit 73 suffices to achieve both vector control of the main hoisting squirrel-cage induction motor 71 and V/F constant control of the traveling squirrel-cage induction motors 72-1 to 72-8. In the main hoisting mode, it is necessary to lift and lower a heavy container with a large torque and a high accuracy. According to this embodiment, a large torque and accurate control, as obtained by a DC motor, can be obtained by the vector control of the main hoisting squirrel-cage induction motor 71, thereby achieving a preferable operation of the container crane. In the travel mode, torque control characteristics as in a DC motor are not required unlike in the main hoisting mode. According to this embodiment, the traveling squirrel-cage induction motors 72-1 to 72-8 are speed-matching controlled by the V/F constant control of the motors 72-1 to 72-8, thereby achieving a preferable operation of the container crane.

Further, only the second inverter main circuit unit 83 suffices to achieve both vector control of the boom hoisting squirrel-cage induction motor 81 and V/F constant control of the trolley squirrel-cage induction motor 82. In the boom hoisting mode, it is necessary to lift and lower a heavy boom with a large torque and a high accuracy. According to this embodiment, a large torque and accurate control, as obtained by a DC motor, can be obtained by the vector control of the boom hoisting squirrel-cage induction motor 81, thereby achieving a preferable operation of the container crane. In the trolley mode, torque control characteristics as in a DC motor are not required unlike in the boom hoisting mode. According to this embodiment, the trolley squirrel-cage induction motor 82 is speed-matching controlled by the V/F constant control of the motors 82, thereby achieving a preferable operation of the container crane.

Moreover, according to the above embodiment, the two inverter main circuit units 73 and 83 suffice to perform the four modes (the main hoisting mode, the travel mode, the boom hoisting mode and the trolley mode), thereby achieving an operation of the container crane with an economical circuit configuration.

Furthermore, since the container crane driving control system of the present invention is driven by AC motors only in contrast to the conventional system which is driven by DC motors only, the following advantages can be obtained. First, since the hoisting squirrel-cage induction motors are used, the maintenance of the commutator, as required in a DC motor, is not necessary, and the brushes of the DC motors must not be exchanged. Second, the squirrel-cage induction motor, which can easily be totally enclosed, has a structural advantage in that it is unlikely to suffer from salt damage even when the container crane is arranged in a bay area such as a wharf.

In addition, since the system of the present invention is an AC motor system, a field circuit as required in an DC motor is not necessary, resulting in a simple circuit configuration. Further, a field resistor is not necessary unlike in a case where a DC motor is employed as a traveling motor, resulting in a simple circuit configuration.

Moreover, if a DC motor is used as a traveling motor, a shunt resistor or a overload relay is required as a protecting circuit. However, a thermal relay satisfactorily functions as a protecting circuit of an AC motor, which also simplifies the circuit configuration.

As described above, according to this embodiment, a simplified AC motor system can be applied to the container crane driving control system, and the container crane can be operated in the main hoisting mode, the boom hoisting mode, the travel mode and the trolley mode with characteristics required for a container crane.

Figure 6:
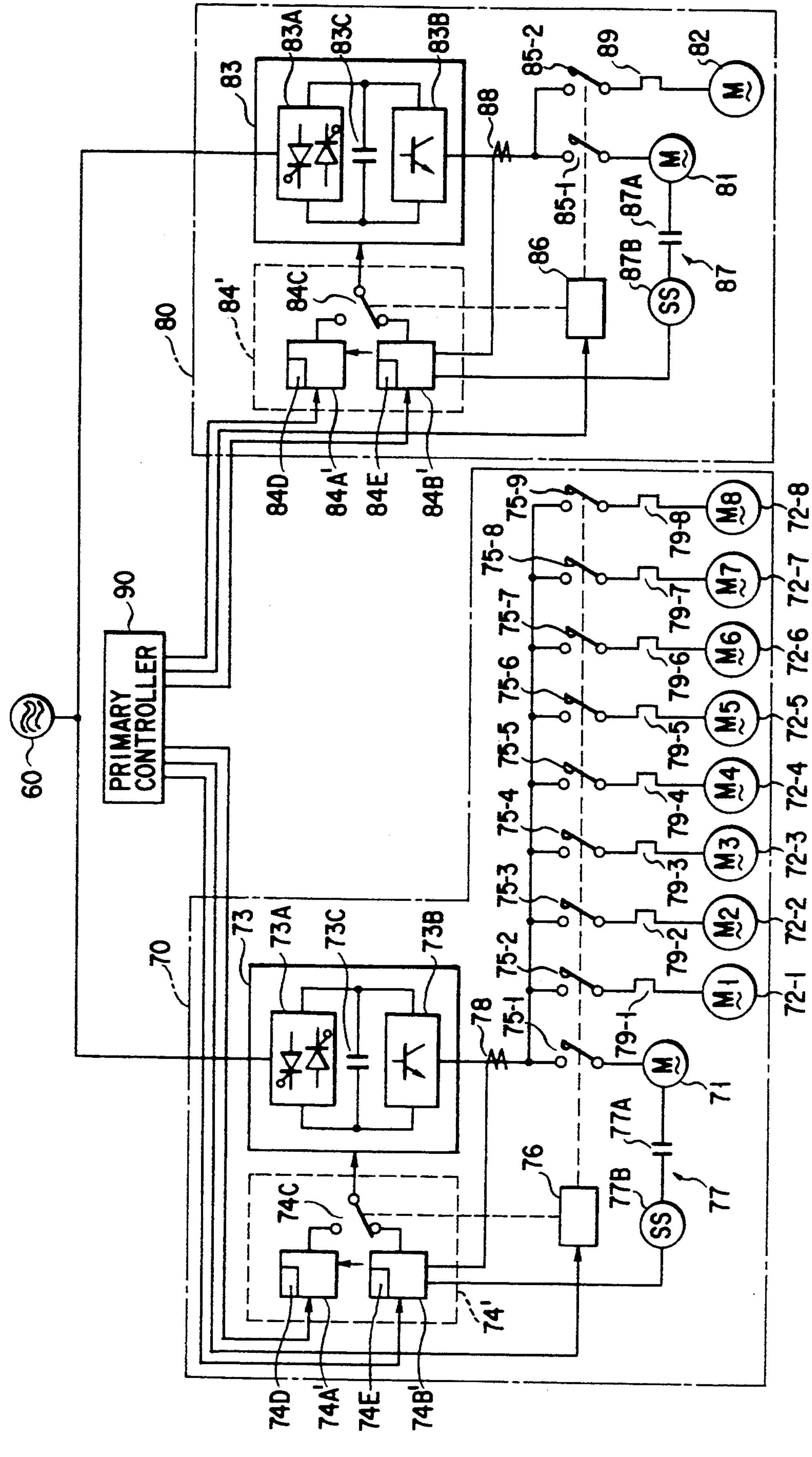
FIG. 6 is a circuit diagram showing a container crane driving control system according to a second embodiment of the present invention.

A second embodiment of the container crane driving control system of the present invention will now be described with reference to FIG. 6, wherein like components are identified with like reference numeral as used in FIG. 3, and descriptions thereof are omitted. The system of the second embodiment has a regeneration function in addition to all the functions of the system of the first embodiment. More specifically, a first inverter control unit 74' comprises regeneration control circuits 74D and 74E for regeneration-controlling the main hoisting squirrel-cage induction motor 71 and the traveling hoisting squirrel-cage induction motors 72-1 to 72-8. The regeneration control circuits 74D and 74E are respectively included in a first V/F constant-control circuit 74A' and a first vector control circuit 74B''.

A second inverter control unit 84' comprises regeneration control circuits 84D and 84E for regeneration-controlling the boom hoisting squirrel-cage induction motor 81 and the trolley squirrel-cage induction motor 82. The regeneration control circuits 84D and 84E are respectively included in a second V/F constant-control circuit 84A' and a second vector control circuit 84B'.

According to the second embodiment, since the squirrel-cage induction motors 71, 72-1 to 72-8, 81 and 82 can be regenerated, it is possible to use the energy efficiently. Of course, the system of the second embodiment can perform all the functions of the first embodiment.

Figure 7:
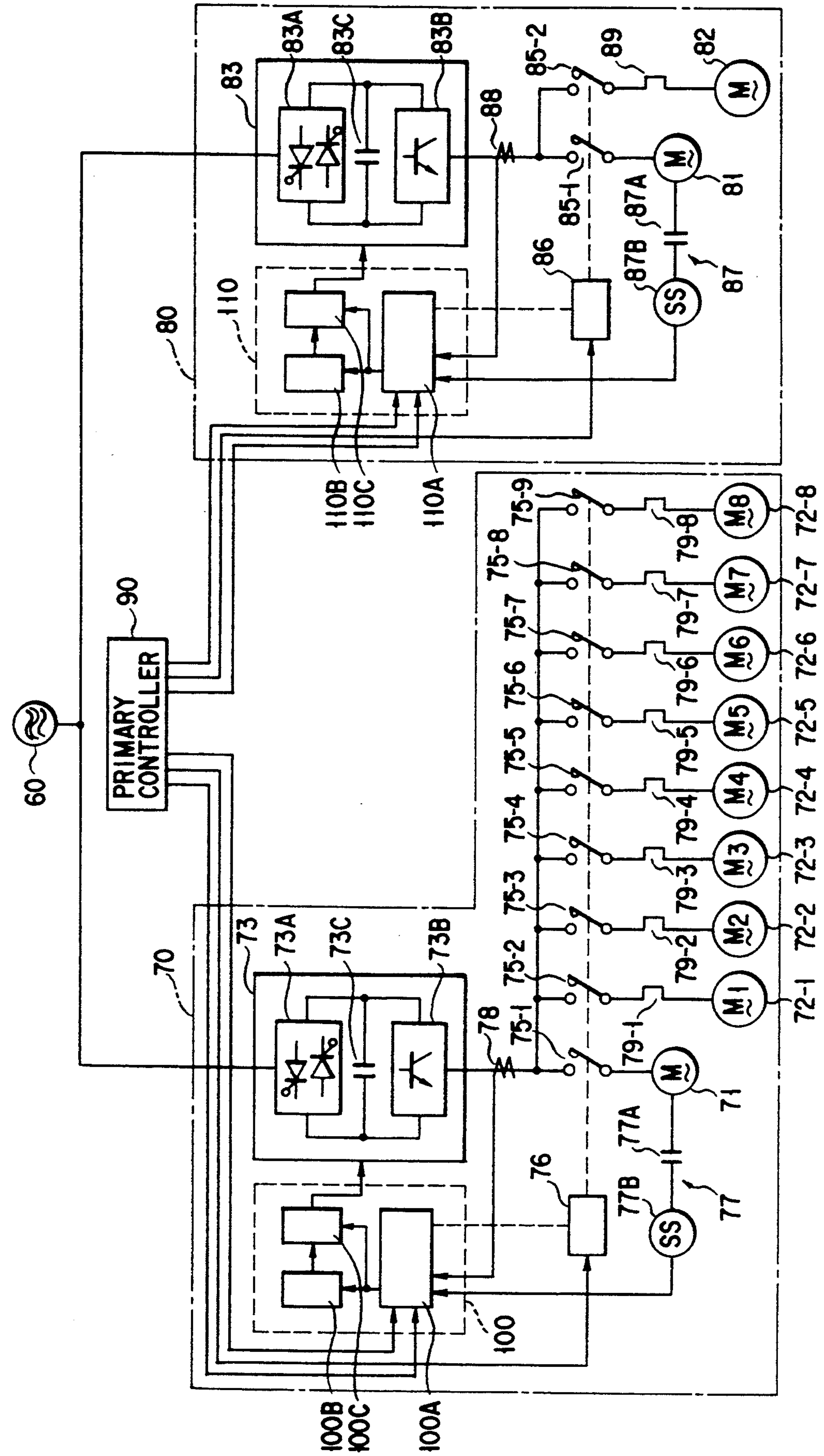
FIG. 7 is a circuit diagram showing a container crane driving control system according to a third embodiment of the present invention.

A third embodiment of the container crane driving control system of the present invention will now be described with reference to FIG. 7, wherein like components are identified with like reference numeral as used in FIG. 3, and descriptions thereof are omitted. In the system of the third embodiment, the functions of the first and second inverter control units 74 and 84 (hardware) of the first embodiment are achieved by software. Although there are differences between hardware and software, inverter control units of the second embodiment perform basically the same functions as the first embodiment.

A first inverter control unit 100 comprises a data storage circuit 100A, a first address generating circuit 100B and a first output circuit 100C. The first data storage circuit 100A prestores first V/F constant-control data for controlling the first inverter main circuit unit 73 so that the ratio of the voltage to the frequency of the AC power supplied to the traveling squirrel-cage induction motors 72-1 to 72-8 is maintained in a preset range. It also prestores first vector control data for vector-controlling the first inverter main circuit unit 73 so that a torque generated by the main hoisting squirrel-cage induction motor 71 is equal to a preset value. The first address generating circuit 100B generates an address for reading either the first V/F constant-control data or the first vector control data from the first data storage circuit 100A, when it receives either a drive command for the traveling squirrel-cage induction motors 72-1 to 72-8 or a drive command for the main hoisting squirrel-cage induction motor 71. The first output circuit 100C supplies, to the first inverter main circuit unit 73, either the first V/F constant-control data or the first vector control data read from the first data storage circuit 100A based on the address generated by the first address generating circuit 100B.

A second inverter control unit 110 comprises a data storage circuit 110A, a second address generating circuit 110B and a second output circuit 110C. The second data storage circuit 110A prestores second V/F constant-control data for controlling the second inverter main circuit unit 83 so that the ratio of the voltage to the frequency of the AC power supplied to the trolley squirrel-cage induction motor 82 is maintained in a preset range. It also prestores second vector control data for vector-controlling the second inverter main circuit unit 83 so that a torque generated by the boom hoisting squirrel-cage induction motor 81 is equal to a preset value. The second address generating circuit 110B generates an address for reading either the second V/F constant-control data or the second vector control data from the second data storage circuit 110A, when it receives either a drive command for the trolley squirrel-cage induction motor 82 or a drive command for the boom hoisting squirrel-cage induction motor 81. The second output circuit 110C supplies, to the second inverter main circuit unit 83, either the second V/F constant-control data or the second vector control data read from the second data storage circuit 110A based on the address generated by the second address generating circuit 110B. Of course, the system of the second embodiment can perform all the functions of the first embodiment.

Figure 8:
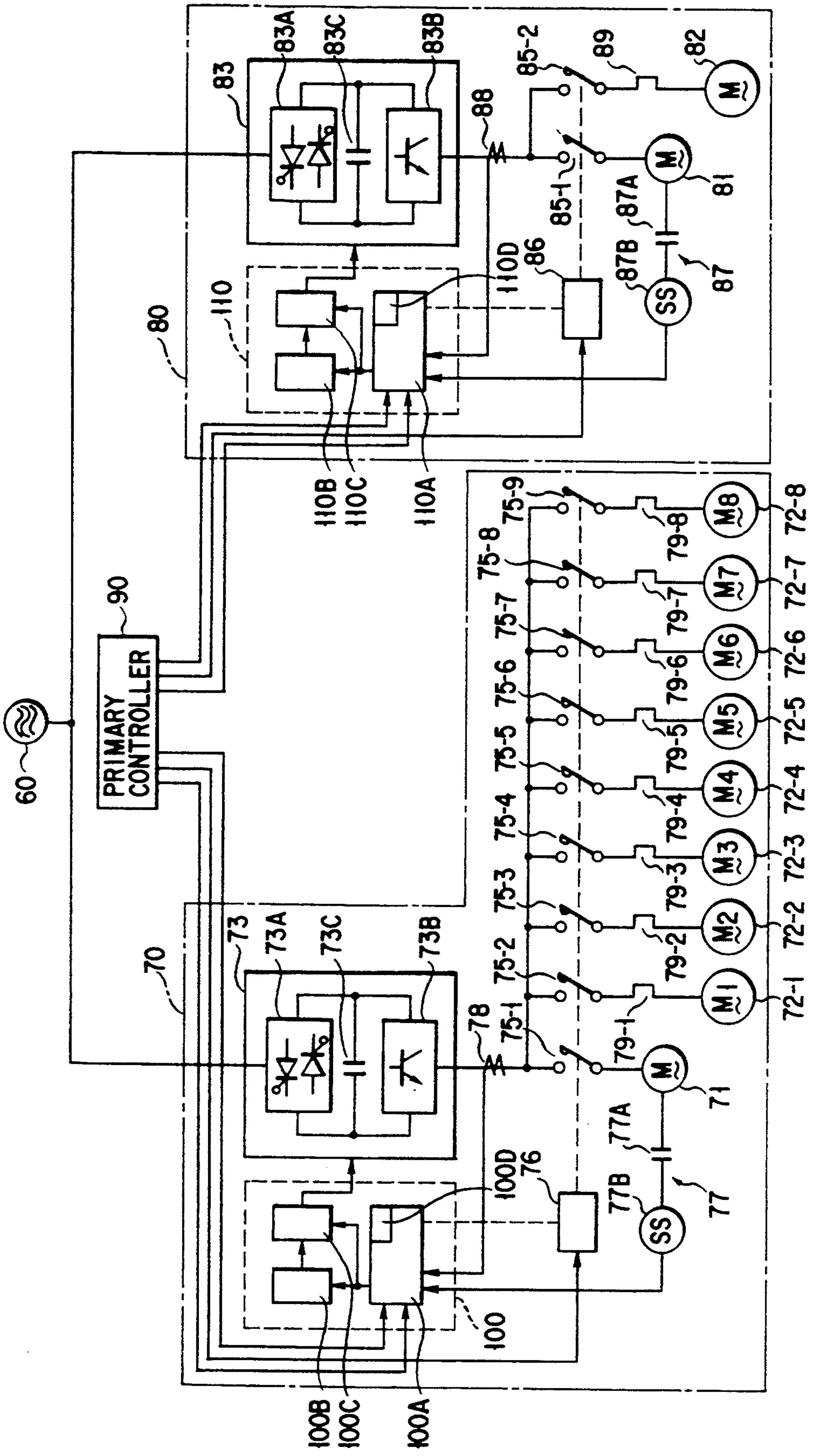
FIG. 8 is a circuit diagram showing a container crane driving control system according to a fourth embodiment of the present invention.

A fourth embodiment of the container crane driving control system of the present invention will now be described with reference to FIG. 8, wherein like components are identified with like reference numeral as used in FIGS. 3 and 7, and descriptions thereof are omitted. The system of the fourth embodiment has a regeneration function in addition to all the functions of the system of the third embodiment. More specifically, a first inverter control unit 100' comprises regeneration control circuits 100D and 100E for regeneration-controlling the main hoisting squirrel-cage induction motor 71 and the traveling hoisting squirrel-cage induction motors 72-1 to 72-8. The regeneration control circuits 100D and 100E are respectively included in a first V/F constant-control circuit 100A' and a first vector control circuit 100B'.

A second inverter control unit 110' comprises regeneration control circuits 110D and 110E for regeneration-controlling the boom hoisting squirrel-cage induction motor 81 and the trolley squirrel-cage induction motor 82. The regeneration control circuits 110D and 110E are respectively included in a second V/F constant-control circuit 110A' and a second vector control circuit 110B'.

According to the fourth embodiment, since the squirrel-cage induction motors 71, 72-1 to 72-8, 81 and 82 can be regenerated, it is possible to use the energy efficiently. Of course, the system of the fourth embodiment can perform all the functions of the third embodiment.

As has been described above, according to the embodiments of the present invention, there is provided a container crane driving control system using AC motor systems and having a simple circuit configuration. In addition, according to the present invention, the container crane can be operated in the main hoisting mode, the boom hoisting mode, the travel mode, and the trolley mode with characteristics required for a container crane.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A container crane driving control system comprising:

a main hoisting squirrel-cage induction motor for lifting and lowering a container;

a plurality of traveling squirrel-cage induction motors for hoisting and lowering a boom;

a first inverter main circuit unit for supplying AC power to the main hoisting squirrel-cage induction motor and the plurality of traveling squirrel-cage induction motors;

a first connecting unit for selectively connecting the main hoisting squirrel-cage induction motor or the plurality of traveling squirrel-cage induction motors with the first inverter main circuit unit;

a first inverter control unit comprising:

a first V/F constant-control circuit for controlling the first inverter main circuit unit so that the ratio of the voltage to the frequency of the AC power supplied to the plurality of traveling squirrel-cage induction motors is maintained in a preset range;

a first vector control circuit for vector-controlling the first inverter main circuit unit so that a torque generated by the main hoisting squirrel-cage induction motor is equal to a preset value; and a first selection circuit for selectively supplying an output from the first V/F constant-control circuit or an output from the first vector control circuit to the first inverter main circuit unit;

a boom hoisting squirrel-cage induction motor for hoisting and lowering the boom;

at least one trolley squirrel-cage induction motor for causing the container to make a traverse motion;

a second inverter main circuit unit for supplying AC power to the boom hoisting squirrel-cage induction motor and the at least one trolley squirrel-cage induction motor;

a second connecting unit for selectively connecting the boom hoisting squirrel-cage induction motor or the at least one trolley squirrel-cage induction motor with the second inverter main circuit unit; and a second inverter control unit comprising:

a second V/F constant-control circuit for controlling the second inverter main circuit unit so that the ratio of the voltage to the frequency of the AC power supplied to the at least one trolley squirrel-cage induction motor is maintained in a preset range;

a second vector control circuit for vector-controlling the second inverter main circuit unit so that a torque generated by the boom hoisting squirrel-cage induction motor is equal to a preset value; and a second selection circuit for selectively supplying an output from the second V/F constant-control circuit or an output from the second vector control circuit to the second inverter main circuit unit.

2. The container crane driving control system according to claim 1, wherein the main hoisting squirrel-cage induction motor includes a brushless resolver for detecting the rotation rate of the main hoisting squirrel-cage induction motor, which rate is to be supplied to the first vector control circuit.

3. The container crane driving control system according to claim 1, wherein the boom hoisting squirrel-cage induction motor includes a brushless resolver for detecting the rotation rate of the boom hoisting squirrel-cage induction motor, which rate is to be supplied to the second vector control circuit.

4. The container crane driving control system according to claim 1, wherein the first connecting unit comprises interlock means for interlocking the first inverter main circuit unit with the main hoisting squirrel-cage induction motor or the plurality of traveling squirrel-cage induction motors, so that, when the main hoisting squirrel-cage induction motor is connected to the first inverter main circuit unit, the traveling squirrel-cage induction motors are not connected to the first inverter main circuit unit, and when the traveling squirrel-cage induction motors are connected to the first inverter main circuit unit, the main hoisting squirrel-cage induction motor is not connected to the first inverter main circuit unit.

5. The container crane driving control system according to claim 1, wherein the second connecting unit comprises interlock means for interlocking the second inverter main circuit unit with the boom hoisting squirrel-cage induction motor or the at least one trolley squirrel-cage induction motor, so that, when the boom hoisting squirrel-cage induction motor is connected to the second inverter main circuit unit, the at least one trolley squirrel-cage induction motor is not connected to the second inverter main circuit unit, and when the at least one trolley squirrel-cage induction motor is connected to the second inverter main circuit unit, the boom hoisting squirrel-cage induction motor is not connected to the second inverter main circuit unit.

6. The container crane driving control system according to claim 1, further comprising a primary controller including:

setting means for setting one of a main hoisting mode for lifting and lowering the container, a travel mode for traveling the crane, a boom hoisting mode for hoisting and lowering the boom and a trolley mode for causing the container to make a traverse motion; and control means for controlling the first and second inverter control unit in accordance with a mode set by the setting means.

7. The container crane driving control system according to claim 1, wherein the first inverter main circuit unit and the first inverter control unit comprise means for regenative control of the main hoisting squirrel-cage induction motor and the plurality of traveling squirrel-cage induction motors.

8. The container crane driving control system according to claim 1, wherein the second inverter main circuit unit and the second inverter control unit comprises means for regenative control of the boom hoisting squirrel-cage induction motor and the at least one trolley squirrel-cage induction motor.

9. A container crane driving control system comprising:

a main hoisting squirrel-cage induction motor for lifting and lowering a container;

a plurality of traveling squirrel-cage induction motors for hoisting and lowering a boom;

a first inverter main circuit unit for supplying AC power to the main hoisting squirrel-cage induction motor and the plurality of traveling squirrel-cage induction motors;

a first connecting unit for selectively connecting the main hoisting squirrel-cage induction motor or the plurality of traveling squirrel-cage induction motors with the first inverter main circuit unit;

a first inverter control unit comprising:

a first data storage circuit which prestores, in predetermined addresses, first V/F constant-control data for controlling the first inverter main circuit unit so that the ratio of the voltage to the frequency of the AC power supplied to the plurality of traveling squirrel-cage induction motors is maintained in a preset range and first vector control data for vector-controlling the first inverter main circuit unit so that a torque generated by the main hoisting squirrel-cage induction motor is equal to a preset value;

a first address generating circuit for generating an address for reading one of the first V/F constant-control data and the first vector control data from the first data storage circuit, when one of a drive command for the plurality of traveling squirrel-cage induction motors and a drive command for the main hoisting squirrel-cage induction motor is supplied thereto; and a first output circuit for supplying, to the first inverter main circuit unit, one of the first V/F constant-control data and the first vector control data read from the first data storage circuit in accordance with the address generated from the first address generating circuit;

a boom hoisting squirrel-cage induction motor for hoisting and lowering the boom;

at least one trolley squirrel-cage induction motor for causing the container to make a traverse motion;

a second inverter main circuit unit for supplying AC power to the boom hoisting squirrel-cage induction motor and the at least one trolley squirrel-cage induction motor;

a second connecting unit for selectively connecting the boom hoisting squirrel-cage induction motor or the at least one trolley squirrel-cage induction motor with the second inverter main circuit unit; and a second inverter control unit comprising:

a second data storage circuit which prestores, in predetermined addresses, second V/F constant-control data for controlling the second inverter main circuit unit so that the ratio of the voltage to the frequency of the AC power supplied to the at least one trolley squirrel-cage induction motor is maintained in a preset range and second vector control data for vector-controlling the second inverter main circuit unit so that a torque generated by the boom hoisting squirrel-cage induction motor is equal to a preset value;

a second address generating circuit for generating an address for reading one of the second V/F constant-control data and the second vector control data from the second data storage circuit, when one of a drive command for the at least one trolley squirrel-cage induction motor and a drive command for the boom hoisting squirrel-cage induction motor is supplied thereto; and a second output circuit for supplying, to the second inverter main circuit unit, one of the second V/F constant-control data and the second vector control data read from the second data storage circuit in accordance with the address generated from the second address generating circuit.

10. The container crane driving control system according to claim 9, wherein the main hoisting squirrel-cage induction motor includes a brushless resolver for detecting the rotation rate of the main hoisting squirrel-cage induction motor, which rate is to be supplied to the first address generating circuit.

11. The container crane driving control system according to claim 9, wherein the boom hoisting squirrel-cage induction motor includes a brushless resolver for detecting the rotation rate of the boom hoisting squirrel-cage induction motor, which rate is to be supplied to the second address generating circuit.

12. The container crane driving control system according to claim 9, wherein the first connecting unit comprises interlock means for interlocking the first inverter main circuit unit with the main hoisting squirrel-cage induction motor or the plurality of traveling squirrel-cage induction motors, so that, when the main hoisting squirrel-cage induction motor is connected to the first inverter main circuit unit, the traveling squirrel-cage induction motors are not connected to the first inverter main circuit unit, and when the traveling squirrel-cage induction motors are connected to the first inverter main circuit unit, the main hoisting squirrel-cage induction motor is not connected to the first inverter main circuit unit.

13. The container crane driving control system according to claim 9, wherein the second connecting unit comprises interlock means for interlocking the second inverter main circuit unit with the boom hoisting squirrel-cage induction motor or the at least one trolley squirrel-cage induction motor, so that, when the boom hoisting squirrel-cage induction motor is connected to the second inverter main circuit unit, the at least one trolley squirrel-cage induction motor is not connected to the second inverter main circuit unit, and when the at least one trolley squirrel-cage induction motor is connected to the second inverter main circuit unit, the boom hoisting squirrel-cage induction motor is not connected to the second inverter main circuit unit.

14. The container crane driving control system according to claim 9, further comprising a primary controller including:

setting means for setting one of a main hoisting mode for lifting and lowering the container, a travel mode for traveling the crane, a boom hoisting mode for hoisting and lowering the boom and a trolley mode for causing the container to make a traverse motion; and control means for controlling the first and second inverter control unit in accordance with a mode set by the setting means.

15. The container crane driving control system according to claim 9, wherein the first inverter main circuit unit and the first inverter control unit comprise means for regenerative control of the main hoisting squirrel-cage induction motor and the plurality of traveling squirrel-cage induction motors.

16. The container crane driving control system according to claim 9, wherein the second inverter main circuit unit and the second inverter control unit comprises means for regenerative control of the boom hoisting squirrel-cage induction motor and the at least one trolley squirrel-cage induction motor.

* * * * *